Nov. 24, 1953     G. S. ALLEN     2,660,212

ROLLER WEDGE LOCK NUT

Filed June 14, 1951

INVENTOR.
GILBERT S. ALLEN
BY
Lyon & Lyon
ATTORNEYS

Patented Nov. 24, 1953

2,660,212

UNITED STATES PATENT OFFICE 2,660,212

ROLLER WEDGE LOCK NUT

Gilbert S. Allen, Los Angeles, Calif.

Application June 14, 1951, Serial No. 231,564

2 Claims. (Cl. 151—25)

This invention relates to improvements in lock nuts of the general type shown in the Mowry Patent No. 753,421, granted March 1, 1904, and particularly directed to an improved locking roller means and retainer means for retaining the roller in place within its recess when the nut is disassembled from the bolt.

Lock nut assemblies of the general type shown in the Mowry patent have not attained widespread commercial success, and this is due at least in part to the fact that the close tolerances recited for reliable action formerly were not obtainable in parts manufactured on a quantity production scale. Modern manufacturing equipment and better quality steels now make it possible to manufacture the parts on a quantity production basis within the tolerances which give reliable action in service. Moreover, my present invention solves the problem of retaining the locking roller against displacement from its recess when the nut is disconnected from the bolt.

The general object of this invention is to provide an improved form of lock nut assembly of the type having a locking roller mounted within a recess in the nut and adapted to engage the threads of a bolt, the parts being constructed with sufficient accuracy so that the nut always tends to tighten under vibration.

Another object is to provide a device of this type which is adapted to be manufactured on a quantity basis and yet which gives reliable action in service.

Another object is to provide a device of this type having a locking roller provided with a series of lobes, the side faces of the lobes being accurately machined for line contact with the threads of the mating bolt, the contact line extending from the outer diameter of the bolt threads to a position approximating the pitch diameter of the bolt threads.

Another object is to provide a device of this type in which the locking roller has a series of lobes, one of the lobes in the series being fully or partially omitted to provide space for a retainer element for preventing disassembly of the locking roller and nut when the nut is disconnected from the bolt.

A more particular object of this invention is to provide an improved form of retainer which passes a clearance space formed by the omission of one of the lobes of the locking roller.

A related object of this invention is to provide a retainer element in the shape of a preformed approximately U-shaped wire which is insertable into operative position within the nut recess in an axial direction.

Other and more detailed objects and advantages of this invention will appear hereinafter.

Figure 1:
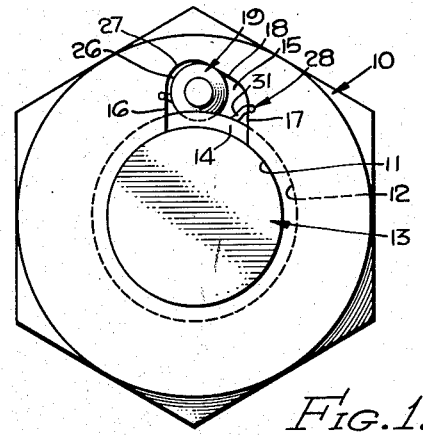
Figure 1 is an end view of a nut and bolt, the nut incorporating a preferred embodiment of my invention.

Referring to the drawings, the nut generally designated 10 is provided with the usual central opening 11 and internal threads 12. The nut 10 may take any convenient form and may be provided with the usual hexagonal configuration or, if desired, may be narrowed on its outer periphery or may be shaped as a wing nut. A bolt generally designated 13 is provided with the usual external threads 14 which mate with the threads 12 in the nut 10.

An axially extending recess 15 is provided in the body of the nut 10, and this recess is defined by a rear wall 16, a forward wall 17 and the bottom wall or cam surface 18. The recess 15 opens inwardly so that it communicates with the central opening 11 in the nut 10.

A locking roller generally designated 19 is axially insertable into the recess 15 and is provided with a series of lobes 20, 21, 22 and 23 which are defined between peripheral grooves 24 formed in the roller 19. The shape of the grooves 24 in the locking roller 19 is such that the side surfaces 25 of the lobes have theoretical line contact with the threads 14 on the bolt 13. The depth of the grooves 24 is such that the flanks of the individual threads 14 are contacted by the side surfaces 25 of the lobes to a point near the pitch diameter of the bolt threads. The lobes 20 are coaxially positioned and have outer peripheries 26 which lie in the same cylindrical surface. These cylindrical surfaces 26 on the lobes are adapted to engage the cam surface 18 on the nut and by wedging prevent relative turning movement of the nut and bolt in one direction. As is viewed in Figure 1, the coaction of the lobes of the locking roller 19 with the cam surface 18 is such as to wedge the nut against counterclockwise turning movement with respect to the stationary bolt 13.

While I have shown a single recess 15 and locking roller 19, it is to be understood that two or three recesses and locking rollers may be provided on the nut if desired. Preferably such recesses would be equally spaced circumferentially about the nut. Additional recesses and locking rollers may be desirable in relatively large size nuts. Furthermore, the recess 15 is illustrated as extending axially completely through the body of the nut 10 whereas in practice it may be desirable to have the recess 15 terminate short of one or both ends of the nut. The angle of inclusion of the cam surface 18 as illustrated is intended for right-hand nuts. If the nut threads and bolt threads are left-hand, the angle of the surface 18 is reversed, as will be readily understood. It is desirable to minimize the size of the recess 15 in order to avoid excessive weakening of the nut 10. On the other hand, it is desirable to have the locking roller 19 of relatively large size for strength, stiffness and reliability of service. Since these two desirable features are contradictory, it is necessary to seek a compromised solution which will afford adequate size for the locking roller and yet which will not seriously weaken the nut 10. The proportions shown in Figures 1–4 of the drawings have been found by experiment to be very nearly ideal for a ½-inch U. S. standard nut.

Figure 2:
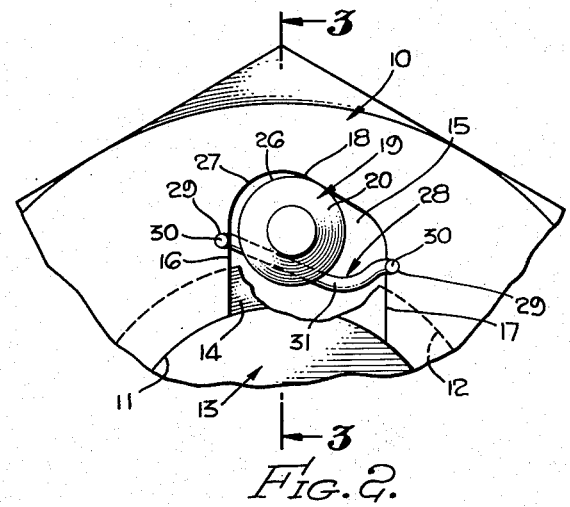
Figure 2 is an end view, partly broken away, showing a portion of Figure 1 on an enlarged scale.

Turning movement of the nut 10 in a clockwise direction with respect to the bolt 13, as viewed in Figure 1, is not resisted by the locking roller 19 since it moves to the rear curved surface 27 of the recess 15. This curved surface 27 connects the rear wall 16 with the cam surface 18. Such movement of the locking roller 19 relative to the nut 10 has a radial component which results in freeing the side surfaces 24 of the lobes from contact with the flanks of the bolt threads 14. It has been found in practice that very little clearance is necessary between the operative position of the locking roller 19, as shown in Figure 2, and the released position wherein the peripheries 26 of the lobes contact the curved wall 27. I have found that it is necessary only to provide sufficient clearance so that the roller moves about 0.005 inch between operative and inoperative positions on the size nut specified above.

Figure 3:
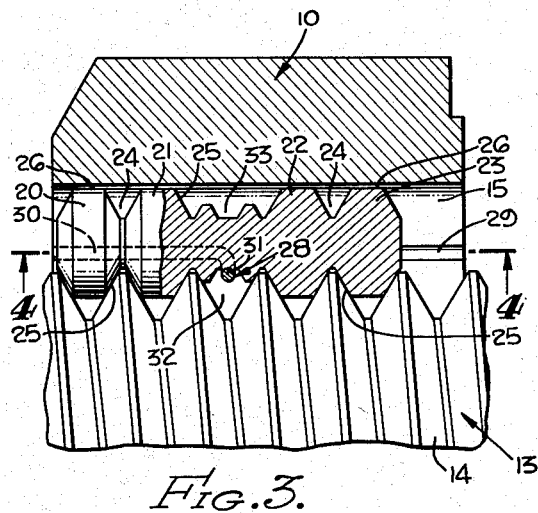
Figure 3 is a sectional view taken substantially on the line 3—3 of Figure 2.
Figure 4:
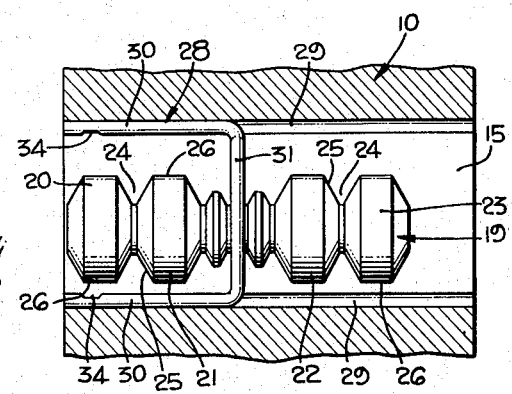
Figure 4 is a sectional detail taken substantially on the line 4—4 of Figure 3.

In accordance with my invention, I provide a novel form of retainer for maintaining the locking roller 19 against displacement from the recess 15 whenever the nut 10 is disassembled from the bolt. When the bolt 13 is in place, as shown in Figures 1–3, the retainer means is unnecessary because the roller 19 is held in place by the threads 14 of the bolt. Before installation on a bolt, however, it is desirable to have some means to hold the roller 19 so that it will not fall out of the recess 15.

As shown in the drawings, I have provided a generally U-shaped retainer wire 28 which is mounted in parallel slots or grooves 29 cut or formed in the walls 16 and 17 of the slot 15. The retainer wire 28 has legs 30 which are received in the parallel grooves 29. The central bight portion 31 on the retainer wire extends across the recess 15 and enters the space 32 within a projected outline of the thread of the nut and between adjacent threads 14 on the bolt. This space 32 is formed by fully or partially omitting one of the lobes in the series which make up the roller 19. As shown in Figure 3, the lobe which would normally be positioned between the lobes 21 and 22 is partially omitted so that a channel 33 is formed on the roller 19. This channel 33 defines the upper boundary of the space 32 through which the retainer wire 28 passes. I have found that a retainer wire of a size of the order 0.015 inch in diameter is satisfactory for the bolt size under discussion. The retainer wire 28 holds the roller 19 loosely in position before the nut 10 is initially installed on the bolt or after it has been disassembled with respect to the bolt. As shown clearly in Figures 2–4, the position of the retainer wire 28 is such that it is not contacted by the bolt threads 14 when the nut 10 is in place on the bolt 13.

The retainer wire 28 is installed at the time of assembly of the locking roller into the recess 15. The legs 30 move axially along the grooves 29 while the locking roller 19 moves axially within the slot 15. Any suitable means may be provided for anchoring the retainer wire 28 in place: as shown in the drawings the retainer wire may be staked at 34 by using a punch-like instrument (not shown) in an obvious manner to deform the sides of the grooves 29 about the legs 30. The grooves 29 may extend completely through the recess 15, if desired, for convenience in manufacture. The retainer wire 28 holds the locking roller 19 in the nut recess 15 with sufficient looseness to assure line-up of the bolt threads 14 with the roller grooves, and to minimize the possibility of "cross-threading" therebetween when the nut is threaded onto the bolt.

An outstanding advantage of the assembly just described is that the nut tends to tighten under vibration conditions but never loosens with respect to the bolt. This is particularly advantageous for installations where the dimensions of the parts clamped by the bolt vary in surface; for example, where the bolt clamps metallic parts about a non-metallic gasket or where the bolt clamps parts which deform under load, the automatic tightening effect caused by vibration is a valuable feature.

Figure 6:
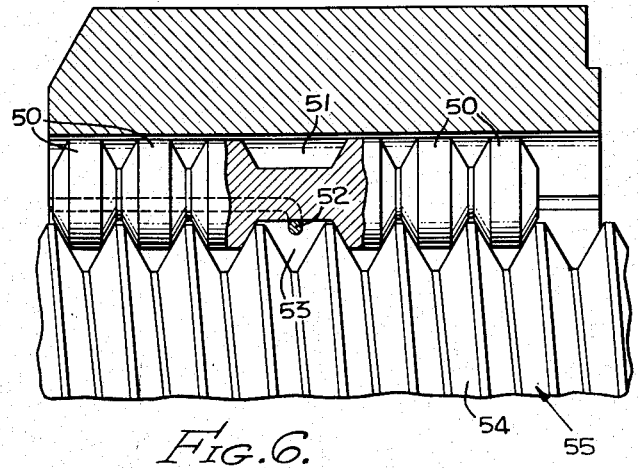
Figure 6 is a view similar to Figure 3 showing a modification of my invention.
Figure 5:
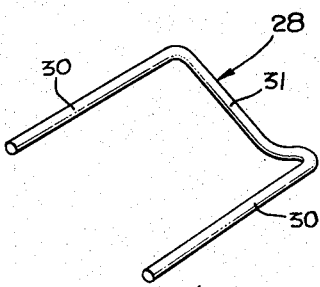
Figure 5 is a perspective view of the retainer element.

For larger sizes of nuts or for any nut having a relatively large number of engaged threads, it may be desirable to provide more than four lobes on the locking roller. Thus, as shown in Figure 6, lobes 50 are shown, three on each side of the central channel 51. The retainer wire 52 is substantially the same as that previously described. This wire has a central portion which passes through the space 53 defined between adjacent threads 54 of the bolt 55. In the form of my invention illustrated in Figure 6, the central lobe is entirely omitted rather than only partially omitted as shown in Figure 3. It will be understood that the central lobe may be fully or partially omitted in either of the forms of the invention illustrated. Furthermore, it is not necessary that the locking roller be symmetrical; on the contrary, two lobes may be provided on one side of the central channel and three lobes on the other. Additional lobes may be added whenever the number of engaged threads so warrants. I have found it desirable to place the central channel 51 at some location roughly midway between the ends of the locking roller in order to minimize objectionable tilting of the locking roller while the nut is being initially mounted on the bolt.

In order to disassemble the nut from the bolt in either of the forms of the invention as illustrated, it is only necessary to move a release pin (not shown) axially into the space between the locking roller and the forward wall of the recess. This serves to move the locking roller to its inoperative position. Thus, as shown in Figure 1, insertion of a release pin into the space between the roller 19 and the forward wall 17 serves to move the roller against the curved wall 27. The nut may then be turned in a counterclockwise direction with respect to the stationary bolt 13. After the nut has been removed from the bolt, the release pin is removed from the nut, and the nut assembly may be used again. The retainer wire 28 prevents the locking roller 19 from dropping out of the recess 15.

Having fully described my invention, it is to be understood that I do not wish to be limited to the details herein set forth, but my invention is of the full scope of the appended claims.

I claim:

1. In a lock nut having a central threaded opening for engagement with a bolt, the combination of: walls on the nut forming an axially extending recess communicating with the central threaded opening in the nut, one of the walls forming a smooth inwardly directed cam surface, a locking roller within the recess having circumferential grooves providing a series of axially spaced lobes, each of the lobes having an outer cylindrical surface and having side faces and being similar in cross section to a corresponding portion of the threads of the nut, the position of the side faces of said lobes and the axial spacing of the lobes being such that the locking roller may be positioned to place all of the lobes within the projected outline of the thread form of the nut, the side faces being engageable with the threads of the bolt, the cylindrical surfaces being engageable with said cam surface to wedge the locking roller inwardly upon circumferential movement of the roller within the recess, the grooves all having substantially the same minimum diameter and just sufficient to clear the crests of the threads of the bolt when the roller is in wedging position, the recess having parallel axial grooves formed in the walls thereof, and a generally U-shaped retainer formed of a single length of wire having sides received in said axial grooves, the bight of the retainer extending across the recess within the projected outline of a thread of the nut and into one of said circumferential grooves for retaining the roller against displacement from the recess when the nut is disassembled from the bolt.

2. A device as set forth in claim 1 in which the threads of the nut have a V shape form and in which the side faces of the lobes are frustoconical in shape.

GILBERT S. ALLEN.

References Cited in the file of this patent

UNITED STATES PATENTS

| Number | Name | Date |
|---|---|---|
| 986,492 | Murdock | Mar. 14, 1911 |
| 1,309,817 | Semple | July 15, 1919 |
| 1,714,952 | Gillespie | May 28, 1929 |
| 1,954,114 | Young | Apr. 10, 1934 |

FOREIGN PATENTS

| Number | Country | Date |
|---|---|---|
| 289,926 | Germany | Jan. 26, 1916 |